Feb. 22, 1949.   L. E. SAUVEY   2,462,290
FISHHOOK SUPPORTING FRAME
Filed March 31, 1945
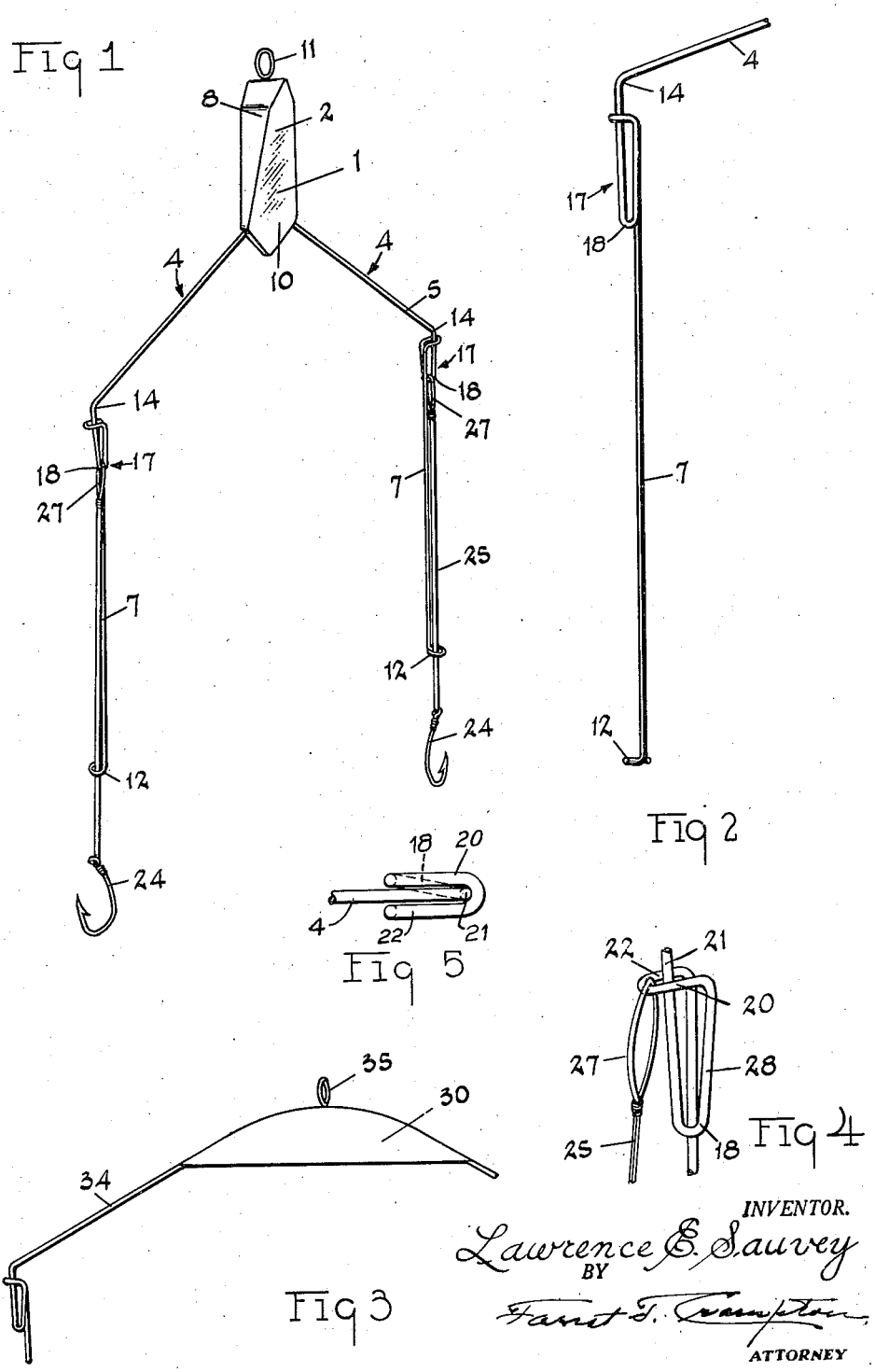
INVENTOR.
Lawrence E. Sauvey
BY
Faust T. Crampton
ATTORNEY Patented Feb. 22, 1949

2,462,290

UNITED STATES PATENT OFFICE 2,462,290

FISHHOOK SUPPORTING FRAME

Lawrence E. Sauvey, Lakeside, Ohio

Application March 31, 1945, Serial No. 585,955

3 Claims. (Cl. 43—28)

My invention has for its object to produce a fish hook supporting frame.

The invention consists in features and advantages which will appear from the following description and upon examination of the drawings. Structures containing the invention may partake of different forms and still embody the invention. To illustrate a practical application of the invention, I have selected a fish hook supporting frame and a modified form thereof as examples of the various structures and details thereof that contain the invention and shall describe the selected structures hereinafter, it being understood that variations may be made without departing from the spirit of the invention. The preferred structure and modified form thereof selected are shown in the accompanying drawing and described hereinafter.

Fig. 1 of the drawing illustrates one form of fish hook supporting frame. Fig. 2 illustrates an enlarged view of the part of the frame shown in Fig. 1. Fig. 3 illustrates a modified form of the fish hook supporting frame shown in Fig. 1. Fig. 4 illustrates an enlarged view of a double loop formed in resilient parts of the frames shown in Figs. 1 and 3. Fig. 5 illustrates an end view of, and looking down on, the loop portions shown in Fig. 4.

The frames 1 are each provided with a metal head or lure 2 that may have light reflecting surfaces. Resilient wires 4 (Fig. 1) are secured to the head or lure 2 and may, if desired, extend through the head and form parts of the frame. The wires 4 project laterally from the lower end of the head and are provided with fish hooks. In the form shown in Fig. 1, the wire 4 is a single wire having a central part embedded in the lower end of the head or lure 2 and has end parts that project from the sides of the head. The wire 4 is bent to form two legs, each of which projects from opposite sides of the lure 2 laterally and is bent as at 14 to form an upper part 5 and a depending end part 7 that extends substantially parallel to the corresponding end part 7.

In the form of construction shown in Fig. 1, the light reflective head or lure 2 is formed wedge shaped having eight lateral surfaces that slope with respect to each other to form an end part 8 having considerable thickness and a reduced width, and a thin opposite end part 10 having a considerable width. The thicker end is provided with a swiveled eye 11, of any well known form, connected to the lure 2 in a manner well known in the art. A line may be connected to the eye 11 for supporting the polished head 2 and the parts of the frame to support the central major axis of the head vertically. Preferably, the ends formed by the sloping surfaces form edges or corners at the upper and lower ends of the head to enable ready movement of the head through the water. The major length is located vertically when supported by the eye 11 and the major width and thinner edge is at its lower end, and thus its center of gravity is near the upper thicker end, and when moved in the water the head and frame readily position themselves nearly horizontal. The larger side sloping surfaces of the head or lure 2 operate to cause the lure, in the majority of castings of the frame, to advance in the direction of the thicker end of the lure due to forward movement caused by the cast when it strikes and descends with respect to the water. This produces a lateral movement of the head and frame when the head enters the water.

If fishing is done through ice, the head and frame may be manually directed and tossed or thrown angularly with respect to the surfaces of the ice and water to cause the head or lure 2 and the frame to move laterally and to locate the frame at a point below the ice somewhat remote from the ice hole. However, when its forward motion ceases or if lifted by the hand string tied to the eye 11, it will approach or return to the ice hole. Also if the frame is cast into a current of water, the head or lure and the frame normally assume an angle to the horizontal by the lateral water pressure on the head or lure. This enables directing the lure away from any fish line previously suspended in the hole and avoids entanglement therewith.

The opposing depending wire parts 7 have closed loops 12 at their lower ends, each of which projects at a right angle to the axis of the wire. Preferably just below the bend 14 that divides the parts 5 and 7 a double loop 17 is formed in each of the wires.

Each double loop 17 (Fig. 4) is formed by bending a wire portion 21 adjacent the bend 14 to form a bend 18 and an upward extension 28 and then bending said extension laterally to form portion 20 in crossing relation to the portion 21 of the wire and again bending the wire to reverse the direction of its extension to form portion 22 which recrosses the portion 21 of the wire in the opposite direction and locates the portion 22 on the opposite side of the portion 21 that the portion 20 is located on, and then bending the wire 90° downwardly to dispose it substantially in alinement with the double loop and particularly the bend 18 thereof. The bends are so formed that either the portions 20 and 21 resiliently press against each other or the portions 22 and 21 resiliently press against each other to confine the loop of a gut when placed in the double loop. As shown the portion 20 is pressed against the portion 21 and may be separated by a lateral pressure on the part 21 or the portion immediately integral therewith to enable the securement of the loop of the gut or to release the gut.

A fish hook 24 is connected to an end of each gut 25 and a loop 27 is formed in the opposite end of the gut. The guts have lengths that are long enough to suspend the fish hooks a short distance below the loops 12 at the ends of the wires when the loops of the guts are secured in the double loops of the wire. In order to readily attach the guts and hooks to the frame, the looped ends of the wires are first inserted through the loops of the guts. The loop of each gut is then moved along the wire to the double loop and moved along the portion 22 and when the portion 21 is deflected sidewise from the portion 20, the loop 27 is passed along the portion 20 to the other of the double loops and dropped to the bend or hook 18. When the loop of the gut is secured in the double loop of the wire, the hook and the end part of the gut may be inserted through the closed loop 12 of the end of the wire and supported by the double loop at a point a short distance from the lower end part of the wire.

In the form of construction shown in Fig. 3, the head or lure 30 has the same thickness at the top part as it has at the lower edge. The two side parts or wires 34 that form the frame are embedded in the upper edge of the head or lure 30 and are bent to form laterally extending parts and parallel side parts, substantially the same as in the frame shown in Fig. 1, both as to the double loops to secure the hook connected looped guts and as to the closed loops at the lower ends of the wires. The head or lure 30 may be connected to a swiveled eye 35 like the swiveled eye 11 (Fig. 1).

I claim:

1. In a fish lure; a light reflecting head part; a plurality of resilient wires protruding from the head part and distributed in spaced relation below and rigidly secured to the head part; each of the wires having closed loops at their free ends in planes at right angles to the ends of the wires; a plurality of fish hooks; a plurality of looped leaders connected to the fish hooks; and the central parts of the wires having double reversed bends which resiliently press against each other to engage and confine the loops of the leaders and locate the hooks below and proximate the free ends of the wires.

2. In a fish lure, a wedge shaped part; means located in the thicker end of the said part for suspending the frame; a slender resilient body having one end secured in the thinner end of the said part and extending downwardly therefrom when the said part is suspended; the free end of the slender body having a confining opening; a hook shaped portion formed from the central portion of the slender body; a gut having a looped end engaged by the hook shaped portion and surrounding the slender body; and a fish hook connected to the gut and located below the free end of the slender body, said gut being insertable in said opening.

3. An attachment for a leader and a fish hook comprising a lure having a weight with an eye at one end thereof, a wire embedded in, and adjacent, the end of the weight opposite the eye and extending at an angle to the longitudinal axis thereof and provided with an obtuse bend portion, the lower end of said bend having a fold upwardly, a portion of the wire adjacent said fold extending about the first named portion of the wire and having a bend extending downwardly substantially parallel to the longitudinal axis of the weight and terminating at its lower end in a bend forming a closed eye, whereby a loop of a leader to which a hook is attached may be applied over the eye so as to surround the wire and be moved along the wire to and about the bends until it is disposed in the fold to be retained therein, the hook of said leader being then passed through the eye so that the hook end of the leader may depend from the eye.

LAWRENCE E. SAUVEY.

REFERENCES CITED

The following references are of record in the file of this patent:

UNITED STATES PATENTS

| Number | Name | Date |
|---|---|---|
| 1,123,636 | Wiesenfeld | Jan. 5, 1915 |

FOREIGN PATENTS

| Number | Country | Date |
|---|---|---|
| 5,766 | Norway | May 6, 1897 |
| 62,212 | Norway | Aug. 23, 1938 |